US009552604B2

(12) United States Patent
Bettridge et al.

(10) Patent No.: US 9,552,604 B2
(45) Date of Patent: Jan. 24, 2017

(54) SYSTEMS AND METHODS FOR GENERATING CUSTOMIZED TRAVEL ITINERARIES

(75) Inventors: Ellen Bettridge, New Canaan, CT (US); Brian Brendell, Hoboken, NJ (US); I-Hsin Chuang, Brooklyn, NY (US); Jennifer L. LaFiura, New York, NY (US); Sheyla Reano, New York, NY (US); Patricia Shores, New York, NY (US); Ryan Patrick Moreno, Miami, FL (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 579 days.

(21) Appl. No.: 13/027,784

(22) Filed: Feb. 15, 2011

(65) Prior Publication Data
US 2012/0209842 A1 Aug. 16, 2012

(51) Int. Cl.
G06F 17/30 (2006.01)
G06Q 30/06 (2012.01)
G06Q 50/14 (2012.01)

(52) U.S. Cl.
CPC ......... *G06Q 30/0631* (2013.01); *G06Q 50/14* (2013.01)

(58) Field of Classification Search
CPC ....................................... H04Q 7/20
USPC ................................. 707/705–788
See application file for complete search history.

(56) References Cited

U.S. PATENT DOCUMENTS

| 6,209,026 | B1 * | 3/2001 | Ran ..................... G06Q 10/047 702/3 |
| 2002/0069093 | A1 * | 6/2002 | Stanfield ............. G06Q 10/107 705/5 |
| 2002/0147619 | A1 * | 10/2002 | Floss et al. ...................... 705/5 |
| 2006/0265361 | A1 * | 11/2006 | Chu ................................. 707/3 |
| 2009/0210262 | A1 * | 8/2009 | Rines et al. ..................... 705/5 |
| 2009/0210264 | A1 * | 8/2009 | Anderson et al. ............... 705/5 |
| 2009/0216633 | A1 * | 8/2009 | Whitsett et al. ................ 705/14 |
| 2009/0276250 | A1 * | 11/2009 | King et al. ....................... 705/5 |
| 2010/0030589 | A1 * | 2/2010 | Narayanaswami .............. 705/5 |
| 2010/0305984 | A1 * | 12/2010 | Ben-Yitschak et al. ......... 705/6 |
| 2011/0213787 | A1 * | 9/2011 | Cerny .......................... 707/749 |

OTHER PUBLICATIONS

Mystery Flights Feb. 7, 2008.*
Hit or Mystery for 2009 holiday. 2009.*

* cited by examiner

*Primary Examiner* — Hosain Alam
*Assistant Examiner* — Tuan-Khanh Phan
(74) *Attorney, Agent, or Firm* — Snell & Wilmer L.L.P.

(57) ABSTRACT

A method for generating a customized travel itinerary is disclosed. The method may comprise associating an individual with a travel sign based upon the results of a travel quiz; associating the individual with a travel location based upon the travel sign and a travel date; and associating the individual with an activity item based upon the travel sign. The method may additionally comprise receiving, by a mobile communication device, a travel itinerary comprising a plurality of travel locations; displaying, by the mobile communication device, a first travel location from the plurality of travel locations prior to a scheduled departure time for the first travel location; and displaying, by the mobile communication device, a second travel location from the plurality of travel locations prior to a scheduled departure time for the second travel location.

20 Claims, 3 Drawing Sheets

SYSTEMS AND METHODS FOR GENERATING CUSTOMIZED TRAVEL ITINERARIES

BACKGROUND

Field of the Invention

The present disclosure generally relates to travel services.

Related Art

Vacations are typically planned in advance by the individuals who will enjoy them. For instance, an individual who has a desire to travel to Hawaii may contact a travel agent, and the travel agent may help the individual to book airline and hotel reservations. In another instance, an individual may arrange the details of his travel on his own (e.g., he may call an airline or use the internet to make his reservations). Existing travel reservation systems are typically unable to recommend, based upon a variety of relevant and useful data, locations and/or activities in which individuals may have an interest. Rather, existing systems often rely upon an individual's knowledge of his preferences and/or a travel agent's knowledge of one or more travel destinations.

Thus, prior art systems require a certain awareness by an individual of his travel plans and the prior art systems are unable to make intelligent recommendations based upon one or more data sets. For certain individuals, it is undesirable to possess advance knowledge of a travel destination, as this may dampen the adventure and excitement associated with the individual's travel experience. Moreover, there are some who may prefer to avoid the decision-making necessary in planning a vacation, or who are simply too busy to plan the numerous details associated with a typical vacation. Accordingly, a variety of systems and methods are disclosed that enable customized, and if an individual desires it, mystery travel options.

SUMMARY

The present disclosure includes a system, method, and article of manufacture for generating a customized travel itinerary. The method may comprise associating an individual with a travel sign based upon the results of a travel quiz; associating the individual with a travel location based upon the travel sign and a travel date; and associating the individual with an activity item based upon the travel sign. The method may further comprise associating the individual with the travel location and/or the activity item based upon the individual's answers to a plurality of questions associated with a travel questionnaire. The individual may be associated with a travel location based upon the individual's travel budget, travel history, and/or geographic location. The method may further comprise receiving a travel location and/or an activity item selected by a travel agent. The method may further comprise receiving feedback from an individual about the travel location and/or the activity item; and deferring from associating the individual with a second travel location and a second activity item based upon negative feedback about the second travel location or second activity item. The method may further comprise enabling access to a first leg of a travel itinerary associated with the individual less than one week prior to a scheduled departure time.

The method may additionally comprise receiving, by a mobile communication device, a travel itinerary comprising a plurality of travel locations; displaying, by the mobile communication device, a first travel location from the plurality of travel locations prior to a scheduled departure time for the first travel location; and displaying, by the mobile communication device, a second travel location from the plurality of travel locations prior to a scheduled departure time for the second travel location. The second travel location may be displayed later in time than the first travel location.

The method may further comprise receiving, by the mobile communication device, the travel itinerary comprising a plurality of activity items; displaying, by the mobile communication device, a first activity item from the plurality of activity items prior to a scheduled time for the first activity item; displaying, by the mobile communication device, a second activity item from the plurality of activity items prior to a scheduled time for the second activity item. The method may further comprise displaying, by the mobile communication device, additional information associated with the first activity item and/or the second activity item and/or the first travel location and/or the second travel location. The method may further comprise uploading, by the mobile communication device, travel content to a travel log associated with a social networking website. The mobile communication device may transmit a location associated with itself and receive, in response, an activity item.

BRIEF DESCRIPTION OF THE DRAWINGS

The features and advantages of the present disclosure will become more apparent from the detailed description set forth below when taken in conjunction with the drawings. The left-most digit of a reference number identifies the drawing in which the reference number first appears.

DETAILED DESCRIPTION

Figure 1:
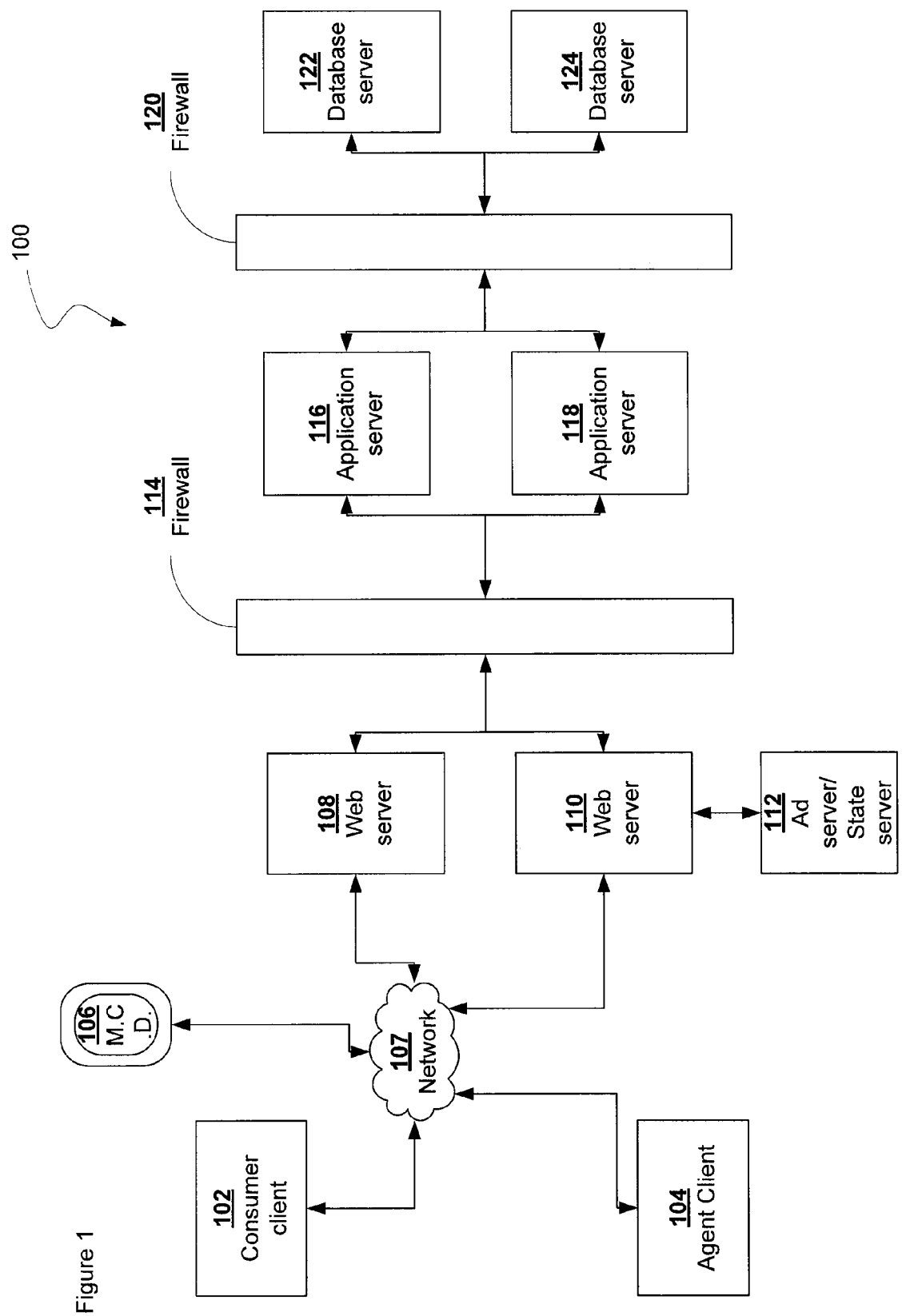
FIG. 1 shows an exemplary system diagram in accordance with an embodiment.

The detailed description of exemplary embodiments herein makes reference to the accompanying drawings, which show the exemplary embodiments by way of illustration and their best mode. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Phrases and terms similar to "financial institution," "transaction account issuer," and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business", "merchant", "supplier" or "seller" may be used interchangeably with each other and shall mean any person, entity, distributor system, software and/or hardware that is a provider, broker and/or any other entity in the distribution chain of goods or services and/or that receives payment or other consideration. For example, a merchant may be a grocery store, a retail store, a travel agency, a service provider, an on-line merchant or the like. For example, a supplier may request payment for goods sold to a buyer who holds an account with a transaction account issuer.

The terms "payment vehicle," "financial transaction instrument," "transaction instrument," or "transaction account product" may be used interchangeably throughout to refer to a financial instrument. As used herein, an account code may or may not be associated with a physical financial instrument.

Phrases and terms similar to a "buyer," "participant", "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases and terms similar to an "item" may include any good, service, information, experience, reward, points, coupons, credits, monetary equivalent, anything of value, something of minimal or no value, etc.

Phrases or terms similar to a "processor" (such as a payment processor) may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases or terms similar to a "payment gateway" or "gateway" may include an application service provider that authorizes payments for e-businesses, online retailers, and/or traditional brick and mortar merchants. A payment gateway may protect transaction account details by encrypting sensitive information, such as transaction account numbers, to ensure that information passes securely between the customer and the merchant and also between merchant and payment processor.

As used herein, "transmit" may include sending electronic data from one system component to another over a network connection. Additionally, as used herein, "data" may include encompassing information such as commands, queries, files, data for storage, and the like in digital or any other form.

As used herein, "issue a debit", "debit" or "debiting" refers to either causing the debiting of a stored value or prepaid card-type financial account, or causing the charging of a credit or charge card-type financial account, as applicable.

Phrases or terms similar to "transaction account" may include any account that may be used to facilitate a financial transaction. A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from an RFID device to an RFID reader or from the RFID reader to the merchant system in magnetic stripe or multi-track magnetic stripe format.

In one exemplary embodiment, a system, method and/or computer program product for generating a customized trip and retrieving a travel itinerary is disclosed. As used herein, a customized trip may include a fully or partially customized trip. A customized trip may be based upon, for example, an individual's travel profile. Further, a customized trip may be partially or fully known to an individual in advance, or kept partially or fully secret from the individual (i.e., maintained as a mystery trip). A travel itinerary may be retrieved by a mobile device and displayed in whole or in segments or legs as an individual progresses towards a travel destination.

Referring to FIG. 1, an exemplary system 100 for generating a customized trip and retrieving a travel itinerary is disclosed. System 100 may comprise a consumer client 102, an agent client 104, a mobile communication device 106, a network 107, a web server 108, a web server 110, an ad server/state server 112, a firewall 114, an application server 116, an application server 118, a firewall 120, a database server 122, and a database server 124.

Consumer client 102, agent client 104, and mobile communication device 106—each or any subset of which may hereinafter be referred to as a "web-client"—may include any device (e.g., personal computer) which communicates via any network 107, for example such as those discussed herein. A web-client may comprise a variety of browsing software or browser applications (e.g., Microsoft Internet Explorer, Mozilla Firefox, Google Chrome, Apple Safari, or any other of the myriad software packages available for browsing the internet). Such browser applications may comprise Internet browsing software installed within a computing unit or a system to conduct online transactions and/or communications. These computing units or systems may take the form of a computer or processor, or a set of computers/processors, although other types of computing units or systems may be used, including laptops, notebooks, hand held computers, personal digital assistants, cellular phones, smart phones (e.g., iPhone®, BlackBerry®, Droid®, etc.) set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network.

As those skilled in the art will appreciate, a web-client may include an operating system (e.g., Windows NT, 95/98/2000/CE/Mobile, OS2, UNIX, Linux, Solaris, MacOS, PalmOS, etc.) as well as various conventional support software and drivers typically associated with computers. A web-client may implement security protocols such as Secure Sockets Layer (SSL) and Transport Layer Security (TLS). A web-client may implement one or more application layer protocols, including, for example, http, https, ftp, and sftp.

Transactions originating at a web client may pass through a firewall (not shown; see below) in order to prevent unauthorized access from users of other networks.

Network 107 may comprise any electronic communications system or method which incorporates software and/or hardware components. Communication may be accomplished through any suitable communication channels, such as, for example, a telephone network, an extranet, an intranet, Internet, point of interaction device (point of sale device, personal digital assistant, smart phone, cellular phone (e.g., iPhone®, Palm Pilot®, Blackberry®), kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although network 107 may be described herein as being implemented with TCP/IP communications protocols, the network 107 may also be implemented using IPX, Appletalk, IP-6, NetBIOS, OSI, any tunneling protocol (e.g. IPsec, SSH), or any number of existing or future protocols. If the network 107 is in the nature of a public network, such as the Internet, it may be advantageous to presume the network 107 to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components described herein may be independently, separately or collectively coupled to the network 107 via one or more data links including, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network 107 may be implemented variously. For example, network 107 may be implemented as an interactive television (ITV) network. The systems and methods disclosed herein contemplate the use, sale and/or distribution of any goods, services or information over any network having functionality similar to that described above with reference to network 107.

Web server 108 and web server 110 may comprise any type of hardware and/or software (e.g., a computer server) configured or configurable to host a website. Typically, such a server comprises a rack mountable server appliance running a suitable server application (e.g., IIS).

Ad server/State server 112 may comprise any type of hardware and/or software (e.g., a computer server) configured or configurable to transmit advertisements to web server 108 and/or 110 and/or save session data associated with web-client 102, agent client 104, and/or mobile communication device 106. Typically, such a server comprises a rack mountable server appliance running a suitable server application (e.g., IIS).

Firewall 114 and firewall 120 may comprise any hardware and/or software suitably configured to protect system 100 components and/or enterprise computing resources from users of other networks. Further, a firewall 114 and/or 120 may be configured to limit or restrict access to various systems and components behind the firewall for web clients connecting through a web server 108/110. Firewall 114 and/or 120 may reside in varying configurations including Stateful Inspection, Proxy based, access control lists, and Packet Filtering among others. Firewall 114 and/or 120 may be integrated within a web server 108/110 or any other CMS components or may further reside as a separate entity. A firewall 114 and/or 120 may implement network address translation ("NAT") and/or network address port translation ("NAPT"). A firewall 114 and/or 120 may accommodate various tunneling protocols to facilitate secure communications, such as those used in virtual private networking. A firewall 114 and/or 120 may implement a demilitarized zone ("DMZ") to facilitate communications with a public network such as the Internet. A firewall 114 and/or 120 may be integrated as software within an Internet server, any other application server components or may reside within another computing device or may take the form of a standalone hardware component.

Application server 116 and/or 118 may comprise any type of hardware and/or software (e.g., a computer server) configured or configurable to handle connections between web server 108 and/or 110 and database server 122 and/or 124. Typically, such a server typically comprises a rack mountable server appliance running a suitable server application (e.g., IIS).

Database server 122 and/or 124 may comprise any type of hardware and/or software (e.g., a computer server) configured or configurable to host a database. Typically, such a server comprises a rack mountable server appliance running a suitable database server (e.g., SQL Server 2008).

As used herein, web server 108, web server 110, ad server/state server 112, firewall 114, application server 116, application server 118, firewall 120, database server 122, and database server 124 may comprise a "backend" portion of system 100. Likewise, consumer client 102, agent client 102, and mobile communication device 106 (each of which may be referred to as a "web-client") may comprise a "front-end" portion of system 100.

Figure 2:
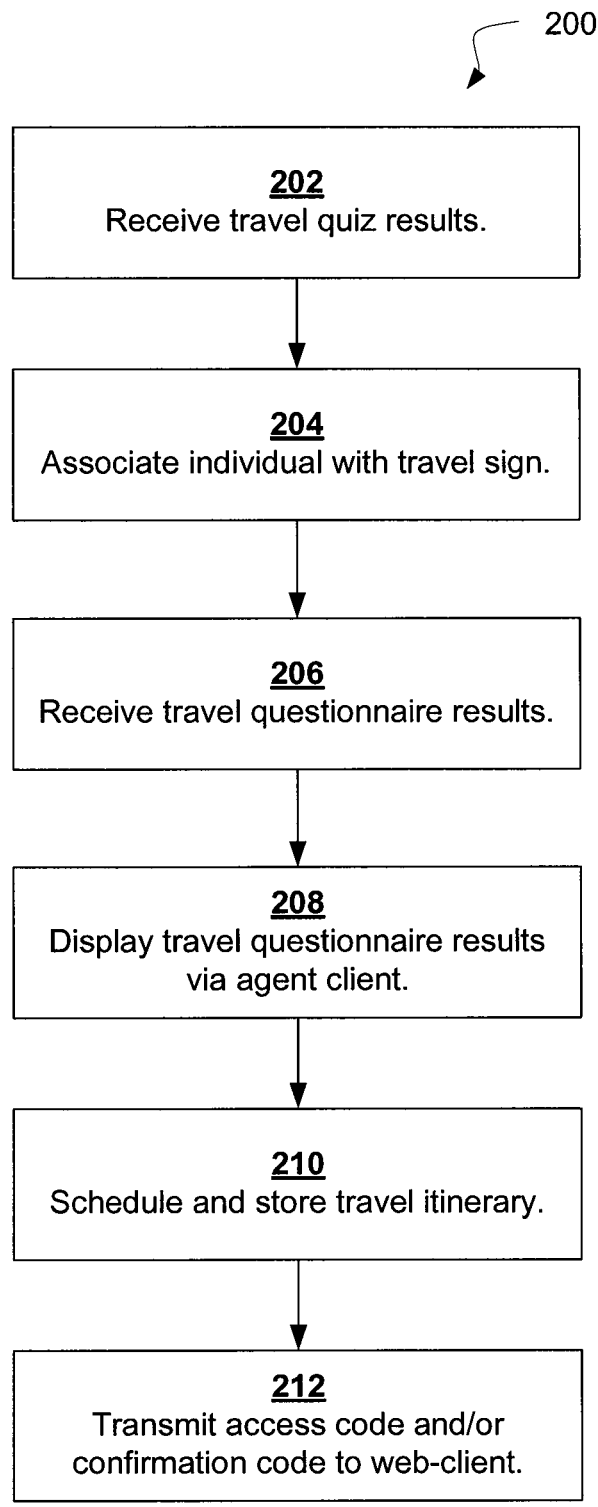
FIG. 2 shows a flowchart depicting an exemplary process for generating a travel itinerary for an individual.

With reference to FIG. 2, an exemplary process 200 for generating a customized travel itinerary is disclosed. A travel itinerary may be fully or partially disclosed to an individual at the time it is generated, or it may be fully or partially kept secret (i.e., as a mystery itinerary), as described more fully below. The travel itinerary may be generated by system 100, and/or by a travel agent acting in concert with system 100, as described in greater detail below.

In an embodiment, an individual may take a travel quiz. An individual may be directed to a travel quiz, or encounter a travel quiz, by way of a cross-marketing web-based tool/website, a social networking website (e.g., Facebook®), and/or the like. A travel quiz may be generated by one or more of the components comprising the backend of system 100 and presented by way of consumer client 102. A travel quiz may comprise a variety of questions, the answers to which may give some insight into the travel preferences of an individual. For instance, a travel quiz may inquire into an individual's interests. An individual's interests may fall into a variety of categories. For example, an individual may be interested in food and drink (a first category). Likewise, an individual may be interested in music, health and wellness, fashion and design, technology, outdoor adventure, and a variety of other categories. An individual's answers to the questions comprising a travel quiz and/or a category associated with an individual's interests may be transmitted to the backend of system 100 (step 202). The backend of system 100 may associate the individual with one or more travel signs (step 204). A travel sign may comprise a label representing an individual's travel preferences. For instance, an individual may be assigned/associated with a travel sign of "technologician," indicating that the individual has or may have an interest in technology. Similarly, an individual may be assigned/associated with a travel sign of scenester, indicating an interest in one or more of the following categories: food and drink, fashion and design, music, technology, and/or outdoor activities. Thus, an individual's travel sign may depend upon the individual's interests. In an embodiment, an individual may be assigned/associated with one or more of the following travel signs: technologician, Trek Star cyber survivor, taste blazer, trengineer, adrenalista, glamorist, rustikeer, scenester, celebutante, histocrat, blisstorian, gastronaut, farbarian, detourist, nature junkie, zenturian, karmakaze, poshaholic, and hiplomat.

A travel sign may serve a variety of purposes. For instance, a travel sign may encourage an individual to take a trip or vacation. Likewise, a travel sign may assist a travel agent and/or system 100 in generating one or more reservations and/or activities associated with a trip/vacation. That is, a travel agent and/or system 100 may make travel reservations for an individual based, at least in part, upon the individual's answers to the questions contained in the travel quiz and/or the individual's travel sign. In addition, a travel sign may help to identify an individual's top trending interests. A top trending interest may comprise a travel location/activity in which an individual is likely to have some interest—as opposed to a travel location/activity in which an individual is somewhat less likely and/or unlikely to have much interest. In an embodiment, an interest (e.g., beachcombing) may comprise a top trending interest if the interest is ranked above a threshold percentage (e.g., 10%) or above a threshold number (e.g., five) above all other interests (e.g., going to a club, surfing, etc.) that the individual may have. That is, if there are 100 possible interests that an individual may have, a top trending interest may comprise an interest that is ranked (based upon the individual's answers to the questions comprising the travel quiz and/or the individual's travel sign) as one of the individual's top ten interests.

In an embodiment, an individual may complete a travel questionnaire. An individual may complete such a questionnaire either before or after he has taken the travel quiz; and a travel questionnaire may be administered via any of the components on the front-end of system 100. In an embodiment, a travel questionnaire may request a variety of personal information of an individual (e.g., email address, phone number, instant messaging (IM) handle and service, etc.). Thus, in an embodiment, a travel questionnaire may attempt to deter or weed out individuals who are not really interested in making a travel reservation. In other words, it is anticipated that a certain percentage of individuals may take the travel quiz merely to discover their travel signs. Although this may be encouraged, in order to preserve resources, system 100 may administer a travel questionnaire in order to filter those less serious individuals out of future stages of process 200. A travel questionnaire may include a variety of questions (in addition to those described above). For example, a travel questionnaire may inquire into an individual's travel budget, travel history, geographic location (e.g., an individual's residential address), hotel preferences, activity level preferences, dietary restrictions, airfare class (i.e., coach, business, first) and a variety of other preferences and information. In an embodiment, an individual may not be required to complete a travel questionnaire at this stage of process 200; rather, an individual may be connected (via telephone or email) with a travel agent, and the travel agent may administer the travel questionnaire. In an embodiment, system 100 may administer a travel questionnaire. An individual's answers to a travel questionnaire may be transmitted by the front end of system 100 to the backend of system 100 (step 206).

In an embodiment, system 100 may, in response to receiving a completed travel questionnaire, notify a travel agent that an individual has completed the travel questionnaire and is awaiting a telephone call/email/chat session/etc. from the travel agent. A travel agent may be provided with a phone number, email address, and/or IM handle and IM service by system 100, with which information the travel agent may contact the individual. The backend portion of system 100 may additionally transmit or display or cause to be displayed for the travel agent the individual's responses to the travel quiz, one or more categories associated with the individual's responses to the travel quiz, the individual's travel sign, and/or the individual's responses to the travel questionnaire; this data may be displayed for the travel agent by way of agent client 104 (step 208).

In an embodiment, a travel agent may use one or more of an individual's travel quiz answers/categories associated therewith, travel sign, and travel questionnaire answers (collectively referred to as an individual's travel profile) to help plan an individual's travel itinerary. As described above, an individual may not actually be allowed to know what sort of reservations a travel agent is booking on his behalf In an embodiment, however, an individual may be aware of his travel reservations as they are being made or shortly thereafter. In an embodiment, a travel agent may depend upon the individual's travel profile to book reservations for the individual that the travel agent believes will be interesting and exciting to the individual. To this end, a travel agent may interact with a planning tool (not shown), which may be displayed for the travel agent by way of agent client 104. In an embodiment, a travel agent may ask an individual questions relating to the individual's interests, dislikes, expectations, and the like. The travel agent may supplement the individual's travel profile with this information to better customize the individual's trip.

A planning tool may comprise software and/or hardware implemented on agent client 104 and/or the backend of system 100. In an embodiment, a planning tool may permit a travel agent to select a region (e.g., North America, Europe, etc.) to which an individual may travel. A travel agent may select a region based upon an individual's travel budget. That is, a travel agent may select a distant travel region for a traveler having an ample budget. Conversely, a travel agent may select a more local travel region for a traveler having a smaller budget. For example, a travel agent may select North America for an individual (who resides in North America) who has a relatively low travel budget. Likewise, a travel agent may select Europe for a European traveler with a low budget. A travel agent may further enter a date or date range ("travel dates") during which an individual may travel or wish to travel. A (software or electronic) calendar may be provided by the planning tool for this purpose.

In an embodiment, a planning tool may populate/retrieve (from a database coupled to system 100) a recommended activity (an "activity item") and/or a travel location based upon a travel region (e.g., North America, Europe, etc.) and/or travel dates and/or an individual's travel profile. System 100 may further locate activity items and/or travel locations based upon closed-loop data, and/or third party content. Third party content may comprise content associated with or developed by Lonely Planet®, Fodor's®, Frommer's®, and/or other travel catalogues/guides/publications. A planning tool may display an explanation or information about an activity item and/or location. This explanation or information may comprise third party content and may assist a travel agent in determining whether an activity item and/or location is appropriate for the individual.

System 100 may tag a location and/or activity item according to a variety of factors or tags. That is, system 100 may tag a location or activity item (such as a beach, carnival, golf course, ice cream shop, bungee jumping, hang gliding, park, shopping center, etc.) listed in a third party travel guide as a location or activity item in which an individual with a particular travel profile may have some interest. For example, system 100 may tag a particular hike as an activity item in which an individual having a travel sign of "nature junkie" (and/or a similarly suggestive travel profile) may be interested. Based upon this tagged content, planning tool may retrieve a tagged activity item (e.g., a hike) for a travel agent planning a trip/activity for an individual whose travel profile suggests an interest in such an activity item (e.g., an individual having a travel sign of "nature junkie"). A travel agent may select the location and/or activity item, in which case the location and/or activity item may be added to the individual's itinerary.

In an embodiment, a travel agent may have access to a variety of feedback from individual's who have earlier participated in process 200. Thus, for example, a travel agent may see that an individual is associated with a travel sign of "glamorist," and, based upon this travel sign, the travel agent may initially believe that a trip to a particular trendy location will be satisfying and exciting for the individual with whom the travel agent is presently working. The travel agent may begin to book reservations accordingly, or the travel agent may look the trendy location up in system 100. In either case, system 100 may include feedback from other individual's whose travel signs are also "glamorist" (preceding glamorists) indicating that the particular trendy location was not to the liking of many of the preceding glamorists. In view of this "closed loop" data (i.e., feedback), the travel agent may defer his decision to make travel reservations at the poorly rated trendy location. Rather, the travel agent may make other reservations (dependent, again, upon the closed-loop data associated with that location).

In an embodiment, a travel agent may not be involved in the process 200 of generating a travel itinerary. Rather, system 100 may fully automate the process. To this end, system 100 may process an individual's travel profile, travel region, travel dates, and/or any closed-loop/third party data in a manner very similar to the manner in which a travel agent might process the information. Specifically, system 100 may select a travel location and/or activity item based upon an individual's travel profile, travel region, travel dates/date range, and/or third party data. System 100 may thereupon check the selected travel location/activity item against closed-loop data to ensure that other individuals have not reported dissatisfaction with the selected location/activity item. In the event that a location and/or activity item is associated with poor reviews, system 100 may select a different travel location and/or activity item, again based upon the individual's travel profile, travel region, travel dates, and/or closed-loop/third party data. System 100 may again check the new travel location/activity item, and if, again, poor reviews are associated with the location/activity item, system 100 may again select a new location/activity item. This process may continue until system 100 locates/retrieves a satisfactory travel location/activity item.

Irrespective of the mechanism by which an individual's travel itinerary is generated (e.g., via travel agent or fully automated by system 100), system 100 may store an individual's travel itinerary for later use by the individual (step 210). An individual's travel itinerary may comprise one or more travel locations and one or more activity items, each associated with the individual. An individual's itinerary may be stored anywhere within system 100, but in an embodiment, an individual's travel itinerary is stored in one or more of database server 122 and database server 124. In response to a storing or completing a travel reservation, system 100 may generate and transmit one or more of an access code and a confirmation email/code to one or more of the webclients (step 212). Thus, an individual and/or travel agent may receive a confirmation code confirming that the individual has travel reservations. Likewise, an individual may receive an access code, which he may use to activate a mobile communication device 106, through which he may receive all or a portion of his travel reservations prior to the time he is scheduled to travel (see below). In an embodiment, a travel agent may not receive or have access to the access code.

Figure 3:
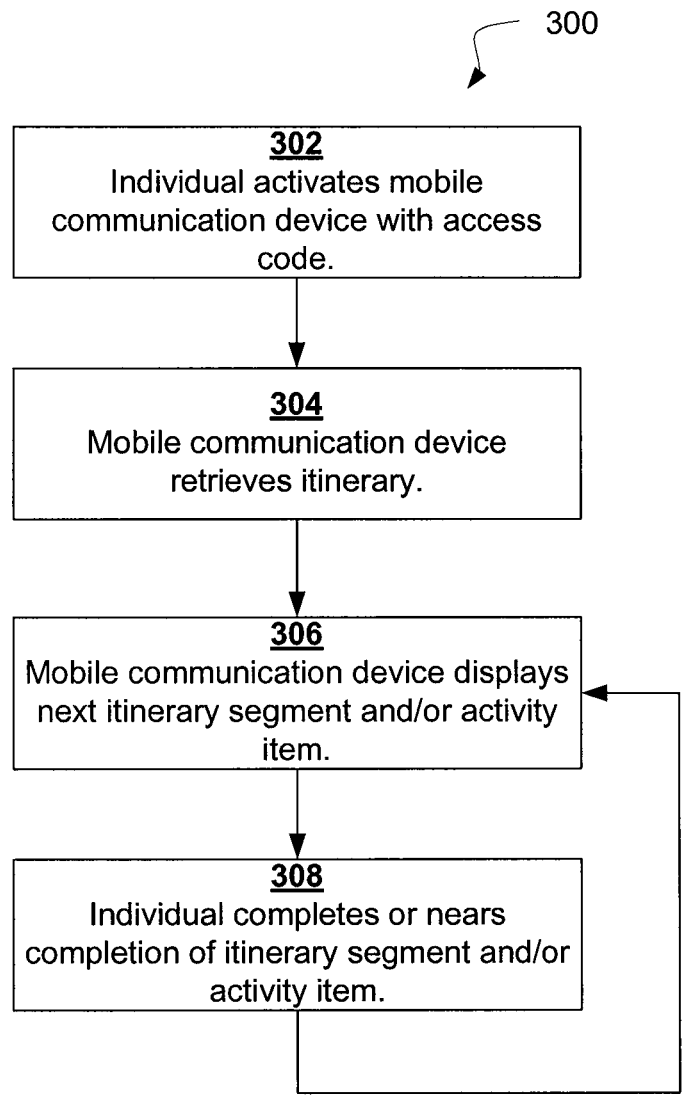
FIG. 3 shows a flowchart depicting an exemplary process for retrieving a travel itinerary.

Referring now to FIG. 3, a process 300 for retrieving segments or legs of a travel itinerary is disclosed. The reader may wish to note that the process 300 applies to mystery travel itineraries, as described elsewhere herein; however, the process 300 may apply to any type of itinerary—e.g., itineraries that are known to an individual beforehand. In an embodiment, an individual who has purchased a trip may receive, in the mail, a mobile communication device 106. An individual may receive mobile communication device 106 several days before he is scheduled to depart. In an embodiment, and where a mobile communication device 106 comprises a stationary object (e.g., a kiosk), an individual may not receive mobile communication device 106 in the mail, but may nevertheless approach mobile communication device 106 to perform the process 300 (e.g., to review/view his itinerary and/or activity items). Mobile communication device 106 may be preloaded with software and/or hardware configured or configurable to receive and display an individual's travel itinerary, either in whole part or in segments or legs. Mobile communication device 106 may be further equipped with hardware and/or software configured or configurable to receive travel suggestions and/or activity items from a backend portion of system 100. The software and/or hardware comprising mobile communication device 106 may further enable mobile communication device 106 to communicate with/update a travel log (e.g., a travel log associated with a Facebook® page). In an embodiment, mobile communication device 106 may comprise an individual's personal mobile communication device (e.g., an individual's personal smart phone). In this embodiment, system 100 may push or upload a variety of software (e.g., one or more software applications) to the individual's mobile communication device 106; the software may perform the functions described above.

In an embodiment, an individual may activate mobile communication device 106 using the access code provided to the individual at the termination of process 200 (step 302). An individual may unlock itinerary content using the access code as well. In an embodiment, mobile communication device 106 is preloaded with an itinerary. Likewise, in an embodiment, mobile communication device 106 downloads from system 100 all or part of an itinerary after an individual enters an access code (step 304). For example, in an embodiment, an individual may enter an access code, at which point he may be permitted by mobile communication device 106 to view the first leg/segment of his upcoming trip (step 306). However, other upcoming legs may, at this point, be blocked out/blacked out/grayed out, etc. such that the individual is unable to retrieve/review their details. Thus, an individual may be provided sufficient detail to timely arrive at the departure location associated with his travel reservation. However, the individual may, at this point, lack the details of his full itinerary. System 100 may enable access to any of the legs/segments and/or activity items comprising an individual's travel itinerary during a specified time period preceding a scheduled departure date/time and/or activity item date/time. For example, system 100 may enable access to a first leg of an individual's travel itinerary less than one week prior to the individual's scheduled departure date. Similarly, system 100 may enable access to subsequent legs of an individual's travel itinerary several hours or days prior to a scheduled departure date/time. Likewise, system 100 may enable access to an activity item several hours or days prior to a scheduled date/time. In this way, even at the time of departure, an individual may be unable to guess his final destination; indeed, the mystery surrounding his trip may intensify as the individual steps onto a train or airplane without any knowledge as to his final destination.

As an individual travels each leg/segment of his itinerary, he may be supplied by mobile communication device 106 at a certain point with information (e.g., a notification) relating to the next leg (steps 308 and 306). For instance, a blocked out/blacked out/grayed out leg or segment may become active or visible. This information may be supplied to the individual after he completes a leg, or as he nears completion thereof. In an embodiment, an individual is provided sufficient time to navigate each leg of his itinerary without rushing. An individual may repeatedly receive the next upcoming leg of his itinerary as he completes the previous leg or as he nears completion thereof until he has reached his final destination. An individual may be presented with his entire travel itinerary prior to departure. An individual may choose whether he wishes to receive information related to each leg as he travels or whether he would prefer to receive the entire itinerary before his initial departure. On a return trip, an individual may be permitted to review his full itinerary prior to departure.

An individual may receive one or more activity items via his mobile communication device 106. An individual may receive a notification that an activity item is scheduled and that the individual, if he wishes to participate in the activity item, should travel to a location of the activity item. As described above, an activity item may be scheduled by a travel agent and/or automatically selected and scheduled by system 100. In an embodiment, system 100 may dynamically select an activity item based upon a location of an individual. This option may be especially useful where, for example, an individual has strayed from his scheduled itinerary (e.g., where the individual has declined to participate in a scheduled activity item). An individual's location may be determined by a variety of means—e.g., via a global positioning system (GPS) built into mobile communication device 106, triangulation of mobile communication device 106 based upon its position relative to one or more cellular base stations, and the like. Thus, system 100 may transmit an activity item to an individual based upon the individual's travel profile, location, third party data, closed-loop data, etc. For instance, an individual associated with a travel profile indicative of an interest in outdoor activities (e.g., nature junkie) and traveling within a particular distance of a hiking or biking trail may receive an activity item suggesting one or both of each relevant identified activity items via his mobile communication device 106.

An individual may select a scheduled or dynamically selected activity item and/or travel location by tapping or touching an area of a display associated with mobile communication device 106, in which case additional information (e.g., third party data regarding the activity item and/or travel location) may be uploaded by the backend of system 100 to mobile communication device 106. For example, an individual may select a hiking activity item. In response to selecting this activity item, mobile communication device 106 may display additional information (e.g., third party content, such as Lonely Planet® content) that is associated with the activity item. The individual may review this information prior to making a decision about whether to participate in the activity item. Where the individual chooses to participate in the activity item, mobile device 106 may display driving/walking/hiking/biking directions to a location of the activity item.

An individual may use mobile communication device 106 to interact with an online travel log (e.g., a travel log associated with a Facebook® or other social networking webpage). A travel log may permit an individual to share his travel activities/travel content with other members of a social networking website. A travel log may comprise password protected content, over which an individual may exercise control, that is viewable only by members of a trusted group (e.g., an individual's friends and/or family). Travel content may comprise any of the variety of data mobile communication device 106 is capable of recording/receiving/gathering. For instance, travel content may comprise audio, video, still photographs, text messages, email, Tweets®, and/or any other mobile and/or web-based content that an individual may wish to post to his travel log. Further, mobile communication device 106 may permit an individual to post content to a travel log by way of a single "click." That is, an individual may post content without logging into (e.g., entering a username and password) his travel log. Rather, an individual may simply select the content that he wishes to post to his travel log (e.g., a photograph) and tap/select/click a "post" option.

An individual may provide feedback to system 100. An individual may give feedback at any stage of his travel, and about any travel location, travel activity, travel carrier, etc., that the individual has encountered. Feedback provided by an individual may be saved by system 100; feedback may be saved by one or more of database servers 122 and 124. Thus, in an exemplary embodiment, an individual may use his mobile communication device 106 to rank or rate a particular travel location, travel activity, travel carrier, etc. A ranking or rating may comprise any ranking or rating system that is suitable for the purpose described above. A ranking or rating system may comprise a thumbs up or thumbs down system, a star-based system (e.g., rank the experience from one to five stars), a scale-based system (e.g., rank the experience from one to ten), etc. As described above, individual feedback may be used by system 100 as part of a closed-loop data system to enhance the travel itinerary and activity item selection/suggestion processes. That is, poorly rated travel destinations, carriers, and/or activities may be recommended or reserved less often (or not at all), while highly rated destinations, carriers, and/or activities may be recommended on a more regular basis.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to impact such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

In an embodiment, various components, modules, and/or engines of system 100 may be implemented as microapplications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, E1 Gamal, Schorr signature, DSA, PGP, PKI, and symmetric and asymmetric cryptosystems.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the inventions have been described as a method in certain embodiments, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   receiving, by a computer-based system, survey data about travel interests of an individual;
   assigning, by the computer-based system, a travel sign to the individual based on the survey data of the travel interests;
   creating, by the computer-based system, a travel itinerary based on the travel sign;
   storing, by the computer-based system, the travel itinerary having multiple booked reservations,
   wherein the travel itinerary includes a first booked reservation for a first travel location associated with a first departure time and options for a second travel location associated with a second departure time, and wherein the first travel location and second travel location are booked, but unknown to an individual associated with the travel itinerary;
   transmitting, by the computer-based system, a packing list including items needed by the individual when traveling in the first travel location and for traveling in the second travel location, while restricting disclosure of the second travel location;
   transmitting, by the computer-based system and to a mobile communication device of the individual, an access code to obtain the travel itinerary for the first travel location while restricting a display of the second travel location,
   wherein the mobile communication device determines the second travel location from the options, after travel to the first travel location is completed on a first day;
   determining, by the computer-based system and in response to completion of the first day, the second travel location from the options and based on the travel sign and activities completed on the first day;
   providing, by the computer-based system, in response to the determining and to the mobile communications device, the second travel location for a second day;
   acquiring, by the computer-based system and in response to the transmitting the access code, a location of the individual while at the second location,
   transmitting, by the computer-based system, in response to the acquiring, based on the travel sign of travel interests and on the second day, a suggested first mystery activity item for the second day at the second location, while the individual is at the second location, wherein the individual was previously unaware of the suggested first mystery activity;
   receiving, by the computer-based system and from the mobile communication device and in response to the transmitting the suggested first mystery activity item, a selection of the suggested first mystery activity item;
   transmitting, by the computer-based system and to the mobile communication device and in response to the receiving the selection, additional information about the suggested first mystery activity item;
   transmitting, by the computer-based system, based on the travel sign of travel interests and on a third day, a suggested second mystery activity item for the third day at the second location, while the individual is at the second location, wherein the individual was previously unaware of the suggested second mystery activity;
   receiving, by the computer-based system and from the mobile communication device and in response to the transmitting the suggested second mystery activity item, a selection of the suggested second mystery activity item; and
   transmitting, by the computer-based system and to the mobile communication device and in response to the receiving the selection, additional information about the suggested second mystery activity item.

2. The method of claim 1, further comprising associating, by the computer-based system, the individual with at least one of: the first travel location or an activity item based upon answers of the individual to a plurality of questions associated with a travel questionnaire.

3. The method of claim 2, further comprising associating, by the computer-based system, the individual with the first travel location based upon a travel budget of the individual, a travel history of the individual, and a geographic location of the individual.

4. The method of claim 3, further comprising notifying, by the computer-based system, a travel agent that the individual has completed a travel questionnaire.

5. The method of claim 4, further comprising displaying, by the computer-based system and through an agent client, at least one of: responses to a travel quiz, a travel sign, or responses to a travel questionnaire.

6. The method of claim 5, further comprising receiving, by the computer-based system, at least one of a travel location or an activity item selected by a travel agent.

7. The method of claim 6, further comprising associating, by the computer-based system, the individual with a travel location that is within a region afforded by a travel budget of the individual.

8. The method of claim 7, further comprising tagging, by the computer-based system, at least one of: the first travel location or an activity item to indicate that the individual associated with a particular travel sign may have an interest.

9. The method of claim 8, further comprising receiving, by the computer-based system, feedback from the individual about at least one of the first travel location or an activity item.

10. The method of claim 9, further comprising deferring, by the computer-based system, from associating the individual with at least one of: the second travel location or a second activity item, based upon negative feedback about at least one of: the pending second travel location or second activity item.

11. The method of claim 10, further comprising transmitting, by the computer-based system, an access code to the individual, wherein the access code enables the individual to access, through the mobile device, the travel itinerary comprising at least one of: the first travel location, the second travel location or an activity item.

12. The method of claim 11, further comprising enabling, by the computer-based system, access to the first travel location less than one week prior to the first departure time.

13. A method comprising:
receiving, by a mobile communication device, survey data about travel interests of an individual;
assigning, by the mobile communication device, a travel sign to the individual based on the survey data of the travel interests;
creating, by the mobile communication device, a travel itinerary based on the travel sign;
storing, by the mobile communication device, the travel itinerary having multiple booked reservations,
wherein the travel itinerary includes a first booked reservation for a first travel location associated with a first departure time and options for a second travel location associated with a second departure time, and wherein the first travel location and second travel location are booked, but unknown to an individual associated with the travel itinerary;
creating and displaying, by the mobile communication device, a packing list including items needed by the individual when traveling in the first travel location and for traveling in the second travel location, while restricting disclosure of the second travel location;
receiving, by the mobile communication device, an access code to obtain the travel itinerary for the first travel location while restricting a display of the second travel location,
determining, by the mobile communication device and in response to completion of the first day, the second travel location from the options and based on the travel sign and activities completed on the first day;
displaying, by the mobile communication device, in response to the determining, the second travel location for a second day;
acquiring, by the mobile communication device and in response to the transmitting the access code, a location of the individual while at the second location,
displaying, by the mobile communication device, in response to the acquiring, based on the travel sign of travel interests and on the second day, a suggested first mystery activity item for the second day at the second location, while the individual is at the second location, wherein the individual was previously unaware of the suggested first mystery activity;
receiving, by the mobile communication device and in response to the transmitting the suggested first mystery activity item, a selection of the suggested first mystery activity item;
displaying, by the mobile communication device and in response to the receiving the selection, additional information about the suggested first mystery activity item;
displaying, by the mobile communication device, based on the travel sign of travel interests and on a third day, a suggested second mystery activity item for the third day at the second location, while the individual is at the second location, wherein the individual was previously unaware of the suggested second mystery activity;
receiving, by the mobile communication device and in response to the transmitting the suggested second mystery activity item, a selection of the suggested second mystery activity item; and
displaying, by the mobile communication device and in response to the receiving the selection, additional information about the suggested second mystery activity item.

14. The method of claim 12, wherein the travel sign is from the group comprising: technologician, Trek Star cyber survivor, taste blazer, trengineer, adrenalista, glamorist, rustikeer, scenester, celebutante, histocrat, blisstorian, gastronaut, farbarian, detourist, zenturian, karmakaze, poshaholic, or hiplomat.

15. The method of claim 14, wherein at least one of the first travel location or the second travel location are selected based on the travel sign.

16. The method of claim 15, wherein at least one of the first travel location or the second travel location are selected based on a top trending interest of the individual.

17. The method of claim 13, further comprising displaying, by the mobile communication device, additional information associated with at least one of: the first travel location or the second travel location.

18. The method of claim 13, further comprising uploading, by the mobile communication device, travel content to a travel log associated with a social networking website.

19. The method of claim 13, further comprising:
transmitting, by the mobile communication device, a location associated with the mobile communication device;
receiving, by the mobile communication device, an activity item based upon the location of the mobile device and a travel profile associated with the individual.

20. A system comprising:
a processor;
a tangible, non-transitory memory configured to communicate with the processor,
the tangible, non-transitory memory having instructions stored thereon that, in response to execution by the processor, cause the processor to perform operations comprising:
receiving, by the processor, survey data about travel interests of an individual;
assigning, by the processor, a travel sign to the individual based on the survey data of the travel interests;
creating, by the processor, a travel itinerary based on the travel sign;
storing, by the processor, the travel itinerary having multiple booked reservations,
wherein the travel itinerary includes a first booked reservation for a first travel location associated with a first departure time and options for a second travel location associated with a second departure time, and wherein the first travel location and second travel location are booked, but unknown to an individual associated with the travel itinerary;
transmitting, by the processor, a packing list including items needed by the individual when traveling in the first travel location and for traveling in the second travel location, while restricting disclosure of the second travel location;
transmitting, by the processor and to a mobile communication device of the individual, an access code to obtain the travel itinerary for the first travel location while restricting a display of the second travel location,
wherein the mobile communication device determines the second travel location from the options, after travel to the first travel location is completed on a first day;
determining, by the processor and in response to completion of the first day, the second travel location from the options and based on the travel sign and activities completed on the first day;

providing, by the processor, in response to the determining and to the mobile communications device, the second travel location for a second day;

acquiring, by the processor and in response to the transmitting the access code, a location of the individual while at the second location, transmitting, by the processor, in response to the acquiring, based on the travel sign of travel interests and on the second day, a suggested first mystery activity item for the second day at the second location, while the individual is at the second location, wherein the individual was previously unaware of the suggested first mystery activity;

receiving, by the processor and from the mobile communication device and in response to the transmitting the suggested first mystery activity item, a selection of the suggested first mystery activity item;

transmitting, by the processor and to the mobile communication device and in response to the receiving the selection, additional information about the suggested first mystery activity item;

transmitting, by the processor, based on the travel sign of travel interests and on a third day, a suggested second mystery activity item for the third day at the second location, while the individual is at the second location, wherein the individual was previously unaware of the suggested second mystery activity;

receiving, by the processor and from the mobile communication device and in response to the transmitting the suggested second mystery activity item, a selection of the suggested second mystery activity item; and transmitting, by the processor and to the mobile communication device and in response to the receiving the selection, additional information about the suggested second mystery activity item.

* * * * *